(12) United States Patent
Oroskar et al.

(10) Patent No.: US 9,426,826 B1
(45) Date of Patent: Aug. 23, 2016

(54) CONTENTION RESOLUTION FOR AN ORTHOGONAL FREQUENCY-DIVISION MULTIPLEXING WIRELESS ACCESS NODE

(71) Applicant: Sprint Communications Company L.P., Overland Park, KS (US)

(72) Inventors: Siddharth Oroskar, Overland Park, KS (US); Maulik K. Shah, Austin, TX (US); Jasinder Pal Singh, Olathe, KS (US); Nitesh Manchanda, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 56 days.

(21) Appl. No.: 14/300,932

(22) Filed: Jun. 10, 2014

(51) Int. Cl.
*H04W 74/08* (2009.01)
*H04W 74/00* (2009.01)

(52) U.S. Cl.
CPC .......... *H04W 74/08* (2013.01); *H04W 74/002* (2013.01)

(58) Field of Classification Search
None
See application file for complete search history.

(56) References Cited

U.S. PATENT DOCUMENTS

| 6,480,525 | B1 | 11/2002 | Parsa et al. |
| 8,427,971 | B2 | 4/2013 | Fischer et al. |
| 8,488,620 | B2 | 7/2013 | Cho et al. |
| 8,620,367 | B2 | 12/2013 | Jeong et al. |
| 2008/0232317 | A1* | 9/2008 | Jen ............ H04W 74/002 370/329 |
| 2010/0067495 | A1* | 3/2010 | Lee ............ H04W 74/008 370/335 |
| 2010/0323736 | A1* | 12/2010 | Fischer ............ H04W 74/0866 455/509 |
| 2011/0207466 | A1* | 8/2011 | Hegge ............ H04W 74/002 455/450 |
| 2012/0069788 | A1* | 3/2012 | Shen ............ H04W 74/006 370/315 |
| 2013/0039314 | A1 | 2/2013 | Prateek et al. |
| 2013/0114515 | A1* | 5/2013 | Koo ............ H04J 11/0023 370/329 |
| 2013/0295946 | A1* | 11/2013 | Panchal ............ H04W 16/14 455/452.1 |
| 2014/0036847 | A1 | 2/2014 | Jeong et al. |
| 2014/0241281 | A1* | 8/2014 | Wu ............ H04W 76/025 370/329 |

FOREIGN PATENT DOCUMENTS

WO 2010107354 A1 9/2010

* cited by examiner

*Primary Examiner* — Donald Mills (57) ABSTRACT

An orthogonal frequency-division multiplexing (OFDM) wireless access node to facilitate contention resolution between wireless communication devices is configured to receive connection requests on a random access channel transmitted from first and second wireless communication devices, transmit a resource allocation message comprising a same resource block to both the first and second wireless communication devices, and receive competing connection request messages transmitted from the first and second wireless communication devices on the same resource block. A contention resolution message is generated and transferred to the first and second wireless communication devices, wherein the first wireless communication device determines that a contention resolution identifier received in the contention resolution message is associated with the first wireless communication device and responsively decodes connection setup information. The second wireless communication device is paged with a contention-free preamble and utilizes the contention-free preamble to request a connection.

20 Claims, 6 Drawing Sheets

CONTENTION RESOLUTION FOR AN ORTHOGONAL FREQUENCY-DIVISION MULTIPLEXING WIRELESS ACCESS NODE

TECHNICAL BACKGROUND

A wireless communication device transmits and receives information wirelessly via a wireless access node to communicate over a communication network. Typically, the wireless access node is part of a radio access network (RAN) which provides the wireless communication device with access to further communication networks, systems, and devices. In fourth generation (4G) long term evolution (LTE) communication systems, a wireless communication device is referred to as user equipment (UE), while a wireless access node is called an enhanced node B (eNodeB).

In LTE systems, when the UE is first powered on, the initial connectivity for the UE requires it to synchronize with the network as a first step in gaining access to network resources. Typically, the UE attempts to achieve uplink timing synchronization with the eNodeB by carrying out a random access procedure (RAP) using a random access channel (RACH) process. The UE may indicate its resource requirement along with transmitting a random access preamble sequence and wait for a random access response (RAR) from the eNodeB. If a positive acknowledgement is not received during a predetermined time period that the UE is configured to wait, the UE may reattempt to achieve uplink timing synchronization with the eNodeB by transmitting another preamble sequence. However, a collision may occur during the RACH process if another UE initiates RAP using the same preamble sequence and receives a resource allocation for the same resource block as the other UE.

OVERVIEW

A method of operating an orthogonal frequency-division multiplexing (OFDM) wireless access node to facilitate contention resolution between wireless communication devices comprises receiving connection requests on a random access channel transmitted from a first wireless communication device and a second wireless communication device. The method further comprises transmitting a resource allocation message comprising a same resource block to both the first wireless communication device and the second wireless communication device. The method further comprises receiving competing connection request messages transmitted from the first wireless communication device and the second wireless communication device on the same resource block. The method further comprises generating a contention resolution message comprising a contention resolution identifier associated with the first wireless communication device, and transferring the contention resolution message for delivery to the first wireless communication device and the second wireless communication device, wherein the first wireless communication device is configured to determine that the contention resolution identifier received in the contention resolution message is associated with the first wireless communication device and to responsively decode connection setup information. The method further comprises paging the second wireless communication device with a contention-free preamble, wherein the second wireless communication device is configured to monitor a channel for the contention-free preamble and utilize the contention-free preamble to request a connection.

An orthogonal frequency-division multiplexing (OFDM) wireless access node to facilitate contention resolution between wireless communication devices comprises a wireless communication transceiver and a processing system. The wireless communication transceiver is configured to receive connection requests on a random access channel transmitted from a first wireless communication device and a second wireless communication device, transmit a resource allocation message comprising a same resource block to both the first wireless communication device and the second wireless communication device, and receive competing connection request messages transmitted from the first wireless communication device and the second wireless communication device on the same resource block. The processing system is configured to generate a contention resolution message comprising a contention resolution identifier associated with the first wireless communication device. The wireless communication transceiver is configured to transfer the contention resolution message for delivery to the first wireless communication device and the second wireless communication device, wherein the first wireless communication device is configured to determine that the contention resolution identifier received in the contention resolution message is associated with the first wireless communication device and to responsively decode connection setup information. The wireless communication transceiver is further configured to page the second wireless communication device with a contention-free preamble, wherein the second wireless communication device is configured to monitor a channel for the contention-free preamble and utilize the contention-free preamble to request a connection.

A computer apparatus to operate an orthogonal frequency-division multiplexing (OFDM) wireless access node to facilitate contention resolution between wireless communication devices comprises software instructions and at least one non-transitory computer-readable storage medium storing the software instructions. The software instructions are configured, when executed by the OFDM wireless access node, to direct the OFDM wireless access node to receive connection requests on a random access channel transmitted from a first wireless communication device and a second wireless communication device, and transmit a resource allocation message comprising a same resource block to both the first wireless communication device and the second wireless communication device. The software instructions are further configured to direct the OFDM wireless access node to receive competing connection request messages transmitted from the first wireless communication device and the second wireless communication device on the same resource block and generate a contention resolution message comprising a contention resolution identifier associated with the first wireless communication device. The software instructions are further configured to direct the OFDM wireless access node to transfer the contention resolution message for delivery to the first wireless communication device and the second wireless communication device, wherein the first wireless communication device is configured to determine that the contention resolution identifier received in the contention resolution message is associated with the first wireless communication device and to responsively decode connection setup information. The software instructions are further configured to direct the OFDM wireless access node to page the second wireless communication device with a contention-free preamble, wherein the second wireless communication device is configured to monitor a channel for the contention-free preamble and utilize the contention-free preamble to request a connection.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
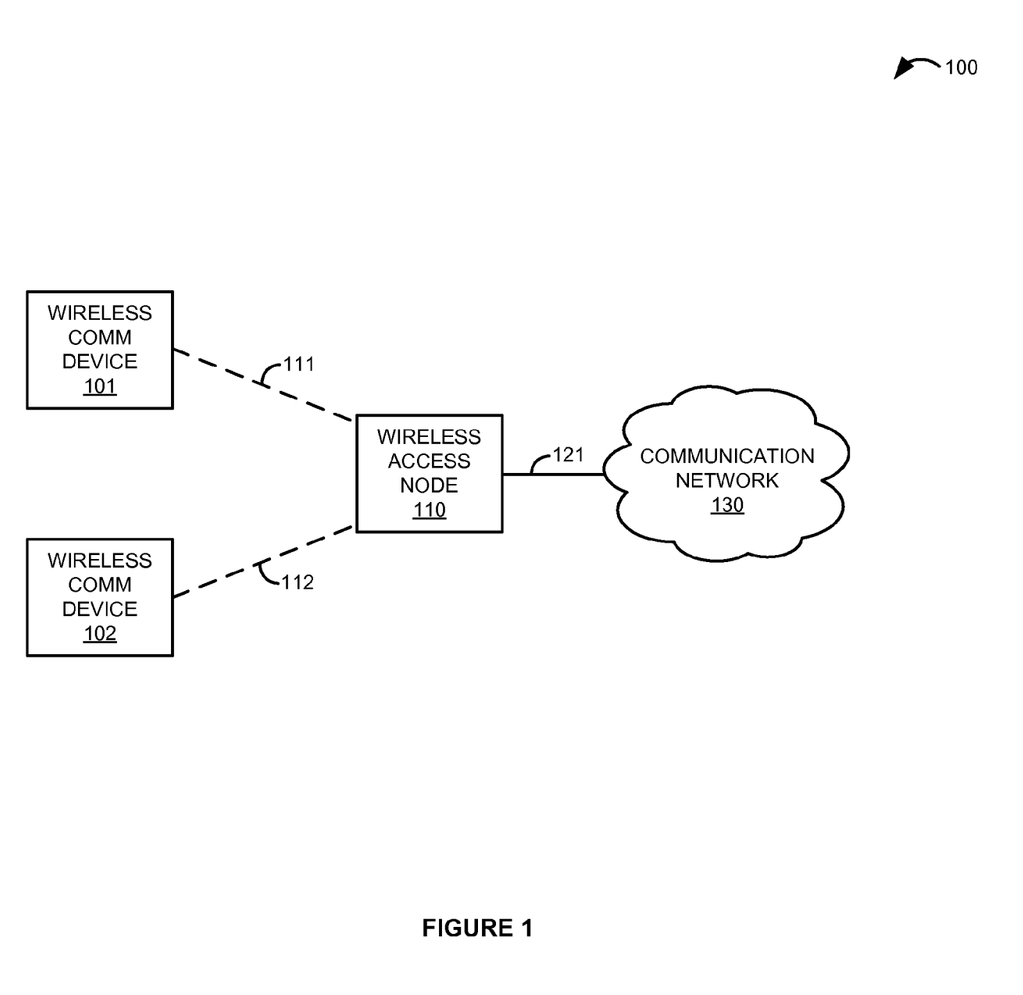
FIG. 1 is a block diagram that illustrates a communication system.

FIG. 1 is a block diagram that illustrates communication system 100. Communication system 100 includes wireless communication devices 101 and 102, OFDM wireless access node 110, and communication network 130. Wireless communication device 101 and wireless access node 110 are in communication over wireless communication link 111. Likewise, wireless communication device 102 and wireless access node 110 are in communication over wireless communication link 112. Wireless access node 110 and communication network 130 communicate over communication link 121.

Figure 2:
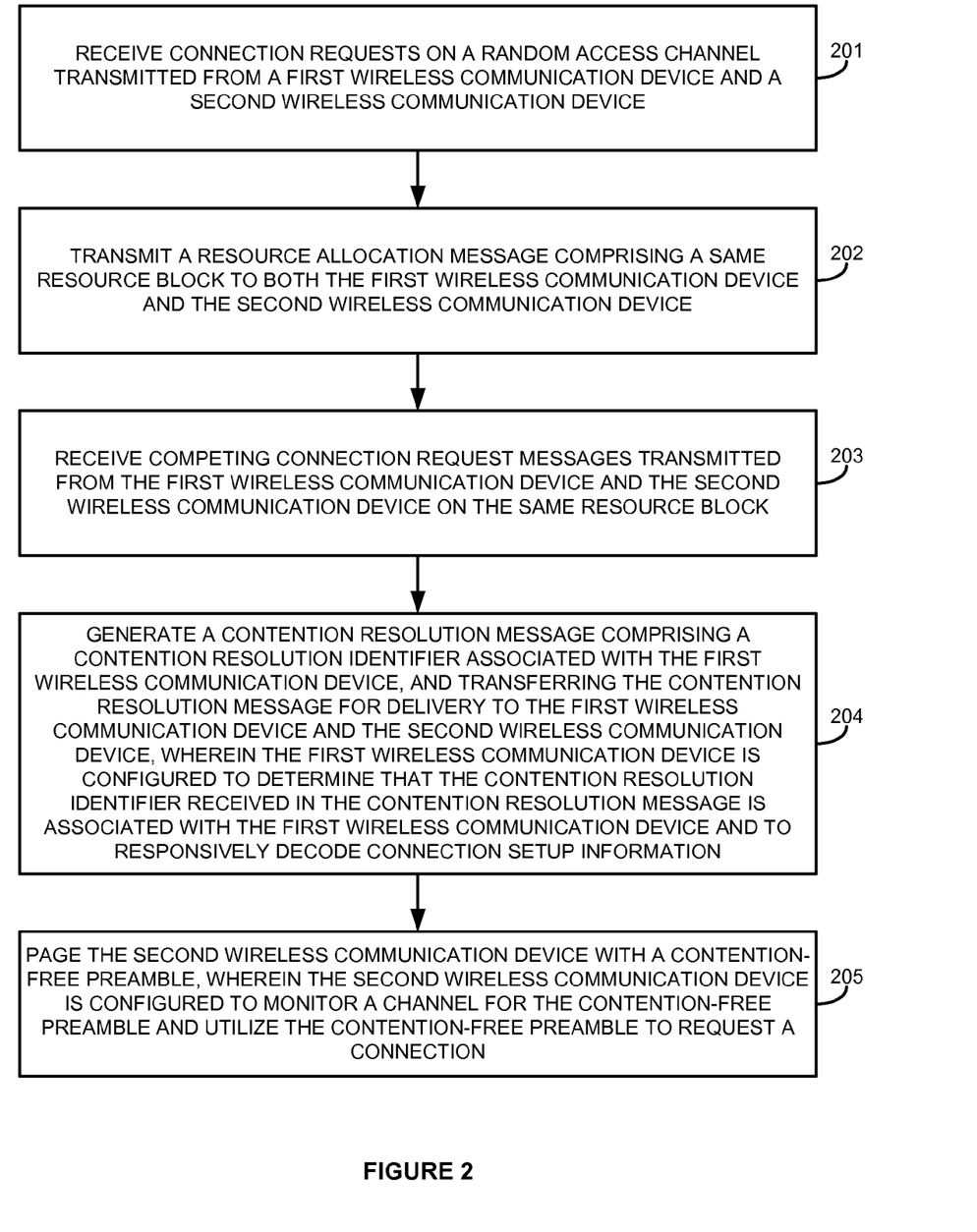
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by wireless access node 110 to facilitate contention resolution between wireless communication devices.

As shown in the operational flow of FIG. 2, wireless access node 110 receives connection requests on a random access channel transmitted from a first wireless communication device 101 and a second wireless communication device 102 (201). A random access channel (RACH) typically comprises a shared communication mechanism commonly used by wireless communication devices 101 and 102 in order to initially synchronize with OFDM wireless access node 110 and request access to communication network 130. In some examples, OFDM wireless access node 110 receives the connection requests on the random access channel with a same preamble sequence and having a same random access radio network temporary identifier (RA-RNTI). Because wireless communication devices 101 and 102 both initiate RACH with the same preamble sequence, a collision occurs during the RACH process since devices 101 and 102 are both transmitting in the same RACH instance.

OFDM wireless access node 110 transmits a resource allocation message comprising a same resource block to both the first wireless communication device 101 and the second wireless communication device 102 (202). Typically, OFDM wireless access node 110 is unaware that a collision has occurred during the RACH process between wireless communication devices 101 and 102, so node 110 transmits the resource allocation message to both devices 101 and 102. The resource allocation message sent to both wireless communication devices 101 and 102 allocates the same resource block to both devices, effectively placing devices 101 and 102 in contention for the same resource block.

OFDM wireless access node 110 receives competing connection request messages transmitted from the first wireless communication device 101 and the second wireless communication device 102 on the same resource block (203). Since only one of the wireless communication devices 101 and 102 can utilize the resource block, devices 101 and 102 are in contention for access to communication network 130 on the same resource allocation. The competing connection request messages may typically comprise radio resource control (RRC) connection requests. In some examples, the competing connection request messages could comprise a first connection request message comprising a first contention resolution identifier (CRI) associated with the first wireless communication device 101, and a second connection request message comprising a second CRI associated with the second wireless communication device 102.

OFDM wireless access node 110 generates a contention resolution message comprising a contention resolution identifier associated with the first wireless communication device 101 and transfers the contention resolution message for delivery to the first wireless communication device 101 and the second wireless communication device 102 (204). In some examples, the connection request messages received from wireless communication devices 101 and 102 include a unique contention resolution identifier individually associated with each respective device 101 and 102. Typically, OFDM wireless access node 110 selects one of the wireless communication devices 101 and 102 as the winner and includes the CRI associated with the selected device 101 or 102 in the contention resolution message. In some examples, OFDM wireless access node 110 could select the winner based on any effective selection technique or scheduling algorithm, including random, round-robin, first in/first out, or any other manner of selecting between wireless communication devices 101 and 102.

This example assumes that OFDM wireless access node 110 has selected the first wireless communication device 101 for connection setup, and thus includes the contention resolution identifier associated with device 101 in the contention resolution message. The first wireless communication device 101 is configured to determine that the contention resolution identifier received in the contention resolution message is associated with the first wireless communication device 101 and responsively decodes connection setup information (204). The connection setup information decoded by wireless communication device 101 typically enables device 101 to access and utilize communication network 130. In some examples, the first wireless communication device 101 determines that the contention resolution identifier received in the contention resolution message is associated with the first wireless communication device 101 by determining that the contention resolution identifier received in the contention resolution message matches the first contention resolution identifier associated with the first wireless communication device 101 that device 101 included in the connection request message.

The second wireless communication device 102 also receives the contention resolution message having the contention resolution identifier associated with the first wireless communication device 101. The second wireless communication device 102 may then determine that the contention resolution identifier received in the contention resolution message does not match the second contention resolution identifier associated with the second wireless communication device 102. In this case, OFDM wireless access node 110 pages the second wireless communication device 102 with a contention-free preamble, and the second wireless communication device 102 monitors a channel for the contention-free preamble and utilizes the contention-free preamble to request a connection (205). In other words, instead of retrying to request a connection by initiating RACH with another preamble sequence, the second wireless communication device 102 is configured to remain idle and monitor for the contention-free preamble. For example, the second wireless communication device 102 could monitor a physical downlink control channel for the contention-free preamble responsive to determining that the contention resolution identifier received in the contention resolution message does not match the second contention resolution identifier associated with the second wireless communication device 102.

Advantageously, the contention-free preamble enables the second wireless communication device 102 to avoid further collisions when reattempting to gain access to communication network 130. By remaining idle and waiting for a page with the contention-free preamble from OFDM wireless access node 110, the second wireless communication device 102 is afforded faster entry into communication network 130 than if device 102 reinitiated RACH with another public preamble sequence that could result in further collisions with other devices. Additionally, the second wireless communication device 102 does not bother OFDM wireless access node 110 with repetitive connection request retries since device 102 stays idle and waits to be paged with the contention-free preamble. In this manner, congestion on the uplink channel is reduced due to eliminating multiple repetitive attempts to connect to the network, there is less demand on OFDM wireless access node 110, and originations are missed less frequently.

Referring back to FIG. 1, wireless communication devices 101 and 102 may individually comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication devices 101 and 102 may also include a user interface, memory system, software, processing circuitry, or some other communication components. For example, wireless communication devices 101 and 102 could each comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication devices 101 and 102 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication devices 101-102 and OFDM wireless access node 110.

OFDM wireless access node 110 comprises RF communication circuitry and an antenna. The RF communication circuitry typically includes an amplifier, filter, RF modulator, and signal processing circuitry. OFDM wireless access node 110 may also comprise a router, server, memory device, software, processing circuitry, cabling, power supply, network communication interface, structural support, or some other communication apparatus. OFDM wireless access node 110 could comprise a base station, Internet access node, telephony service node, wireless data access point, or some other wireless communication system—including combinations thereof. Some examples of OFDM wireless access node 110 include a base transceiver station (BTS), base station controller (BSC), radio base station (RBS), Node B, enhanced Node B (eNodeB), and others—including combinations thereof. Wireless network protocols that may be utilized by OFDM wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Wireless communication links 111 and 112 use the air or space as the transport medium. Wireless communication links 111 and 112 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication links 111 and 112 may comprise many different signals sharing the same link. For example, wireless communication links 111 and 112 could include multiple signals operating in a single propagation path comprising multiple communication sessions, frequencies, timeslots, transportation ports, logical transportation links, network sockets, IP sockets, packets, or communication directions—including combinations thereof.

Communication link 121 uses metal, air, space, optical fiber such as glass or plastic, or some other material as the transport medium—including combinations thereof. Communication link 121 could use various communication protocols, such as TDM, IP, Ethernet, telephony, optical networking, hybrid fiber coax (HFC), communication signaling, wireless protocols, or some other communication format— including combinations thereof. Communication link 121 may be a direct link or could include intermediate networks, systems, or devices.

Figure 3:
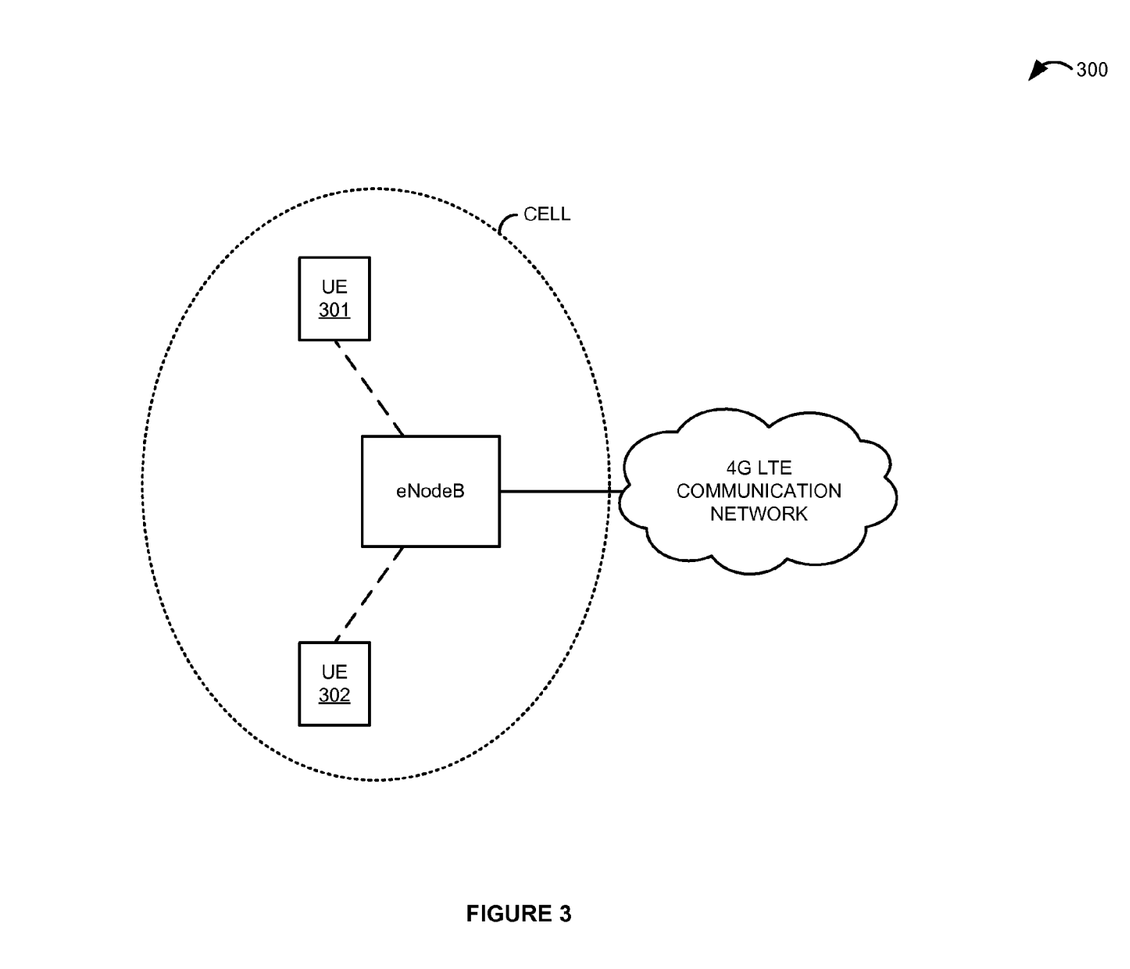
FIG. 3 is a block diagram that illustrates a communication system in an exemplary embodiment.

FIG. 3 is a block diagram that illustrates long term evolution (LTE) communication system 300 in an exemplary embodiment. LTE communication system 300 includes an enhanced Node B (eNodeB) base station that is in communication with the 4G LTE communication network. LTE communication system 300 also includes user equipment (UE) devices 301 and 302 which are shown as being served by the eNodeB base station. The eNodeB base station provides an example OFDM of wireless access node 110, although node 110 may use alternative configurations. The 4G LTE communication network could include a mobility management entity (MME), serving gateway (SGW), packet data network gateway (PGW), and other network elements typically found in an LTE network. The eNodeB serves a cell having a wireless coverage area with approximate boundaries as indicated by the dotted line encircling the eNodeB, which is typically defined by the signal propagation characteristics and coverage capabilities of the eNodeB.

In order to access the internet and other communication services, UE devices 301 and 302 typically need to acquire a resource allocation and successfully register with the network. LTE communication networks commonly employ a random access channel (RACH) that may be used by UE devices 301 and 302 in order to initially synchronize with the network and request a connection. Typically, the UE devices 301 and 302 initiate RACH using a publically available preamble, which could put UE devices 301 and 302 in contention for the same resource allocation in situations where UEs 301 and 302 use the same preamble sequence and request connections in the same RACH instance. A detailed description of how the eNodeB might handle the contention resolution and expedite the allocation of different resource blocks to both UE devices 301 and 302 will now be discussed with respect to FIG. 4.

Figure 4:
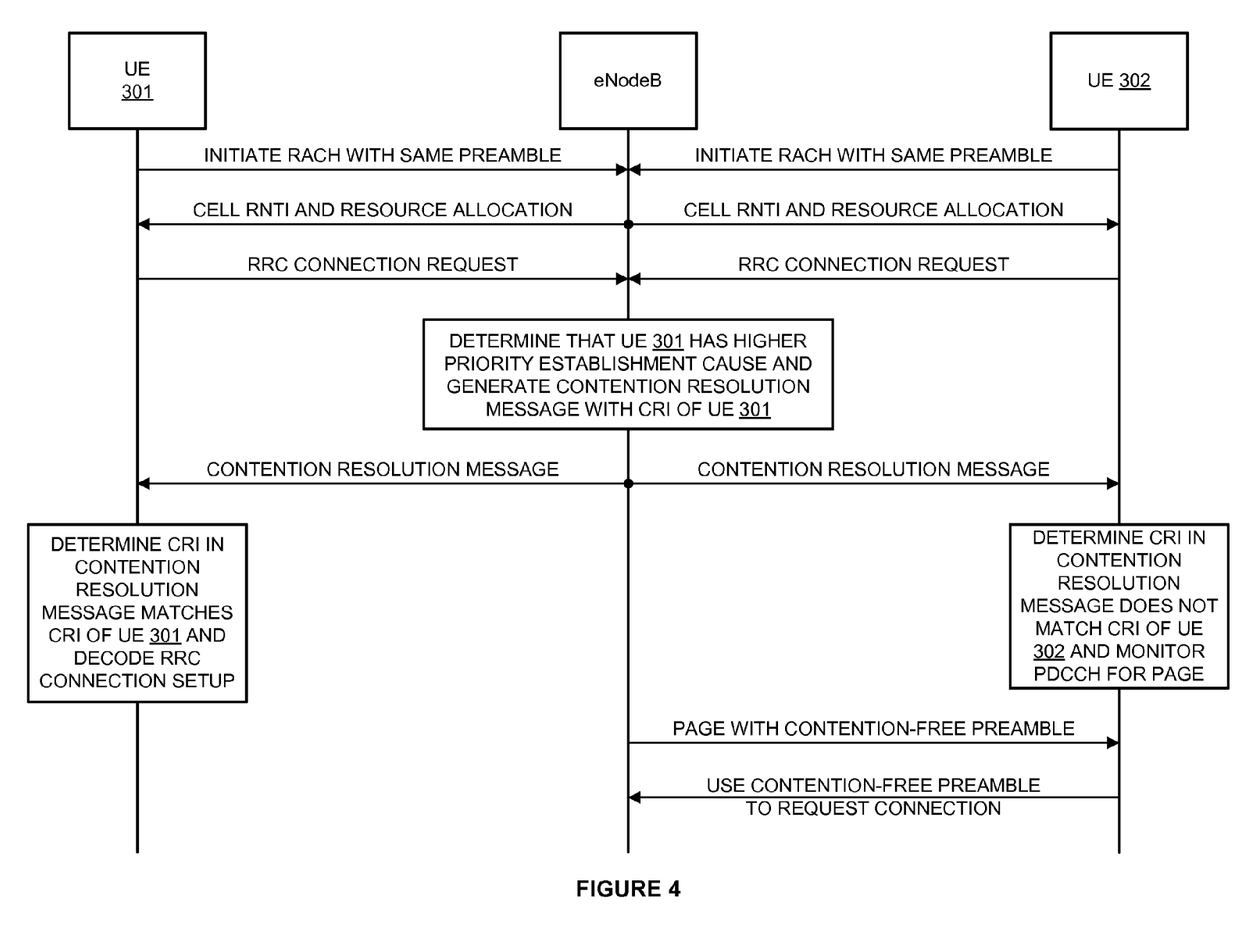
FIG. 4 is a sequence diagram that illustrates an operation of a communication system in an exemplary embodiment.

FIG. 4 is a sequence diagram that illustrates an operation of LTE communication system 300 in an exemplary embodiment. In this example, UE devices 301 and 302 are initially unregistered with the LTE network. In order to request a connection, both UE devices 301 and 302 initiate RACH with the same preamble sequence, which results in a collision during the RACH process. The UE devices 301 and 302 would also have the same random access radio network temporary identifier (RA-RNTI) since they are transmitting in the same RACH instance.

The eNodeB is unaware that a collision has occurred at this point and sends out a temporary cell RNTI (C-RNTI) and resource allocation to both UEs 301 and 302 so that they both receive the same information. The resource allocation specifies the same resource block for both UEs 301 and 302, but only one device 301 or 302 may utilize a resource block at a given time to request a connection. In this example, both UEs 301 and 302 send a radio resource control (RRC) connection request message through the same resource allocation to the eNodeB, resulting in a collision on the resource block.

When a collision occurs, there are three different scenarios that may result. In the first case, the signals act as interference to one another and the eNodeB is unable to decode either of them. In this first scenario, the UEs would not receive a response from the eNodeB since the eNodeB never received the connection requests and both UEs 301 and 302 would have to start over and re-initiate the RACH process. In another possible scenario, the eNodeB might successfully decode only one of the RRC connection requests and fail to decode the other. The eNodeB would then send a hybrid automatic repeat request acknowledgement (HARQ ACK) message to the UE 301 or 302 that sent the decoded RRC connection request.

However, if the eNodeB is able to successfully receive and decode both RRC connection request messages transmitted by the UEs 301 and 302, then the eNodeB needs to employ contention resolution procedures to select one of the UEs for setting up a connection. The eNodeB will thus typically send a contention resolution message with a media access control (MAC) contention resolution identifier (CRI) to both UEs 301 and 302. The CRI included in the contention resolution message carries a reflection of an RRC connection request as generated by one of the UEs 301 or 302 that will be granted a connection. The MAC layer of the UEs 301 and 302 will compare the CRI it embedded in its respective RRC connection request to the CRI included in the contention resolution message. If the CRIs match, the winning UE will proceed to decode the RRC connection setup message and the losing UE will customarily back off and reattempt to initiate RACH with a new preamble.

However, in this example, when the eNodeB successfully receives and decodes RRC connection requests from both UEs 301 and 302, the eNodeB employs an intelligent selection process to determine which of the UEs 301 or 302 should win the contention resolution. The UEs 301 and 302 include an establishment cause in the RRC connection requests which identifies the reason that the UEs are requesting a connection. In some examples, the establishment cause could comprise an emergency, high priority access, mobile terminating access, mobile originating signaling, mobile originating data, and others. When selecting between two RRC connection requests that were received on the same resource block from UEs 301 and 302, the eNodeB would respond in the above-listed order, giving emergency the highest priority, followed by high priority access, mobile terminating access, mobile originating signaling, and finally mobile originating data the lowest priority. In this example, the RRC connection request from UE 301 includes an "emergency" establishment cause, whereas the RRC connection request from UE 302 lists mobile originating data, so the eNodeB selects the CRI of UE 301 for inclusion in the contention resolution message. UE 301 receives the contention resolution message and determines that the CRI included in this message matches the CRI of UE 301 included in its RRC connection request and proceeds to decode the RRC connection setup message.

UE 302 determines that the CRI included in the contention resolution message does not match the CRI that UE 302 included in its RRC connection request. However, instead of backing off and retrying RACH with a new preamble, UE 302 remains idle and keeps monitoring the physical downlink control channel (PDCCH) for a page from the eNodeB. The eNodeB then pages UE 302 with a contention-free preamble to avoid UE 302 from having further collisions. UE 302 can use the contention-free preamble to initiate the RACH process and obtain an uncontested resource allocation in order to provide UE 302 faster access to the LTE communication network. Because UE 302 stops retrying RACH with a public preamble and instead remains idle and waits for the eNodeB to page UE 302 with a contention-free preamble, congestion on the uplink channel is reduced due to avoiding multiple reattempts, missed originations are better avoided, and the delay in establishing a connection for UE 302 is reduced.

Figure 5:
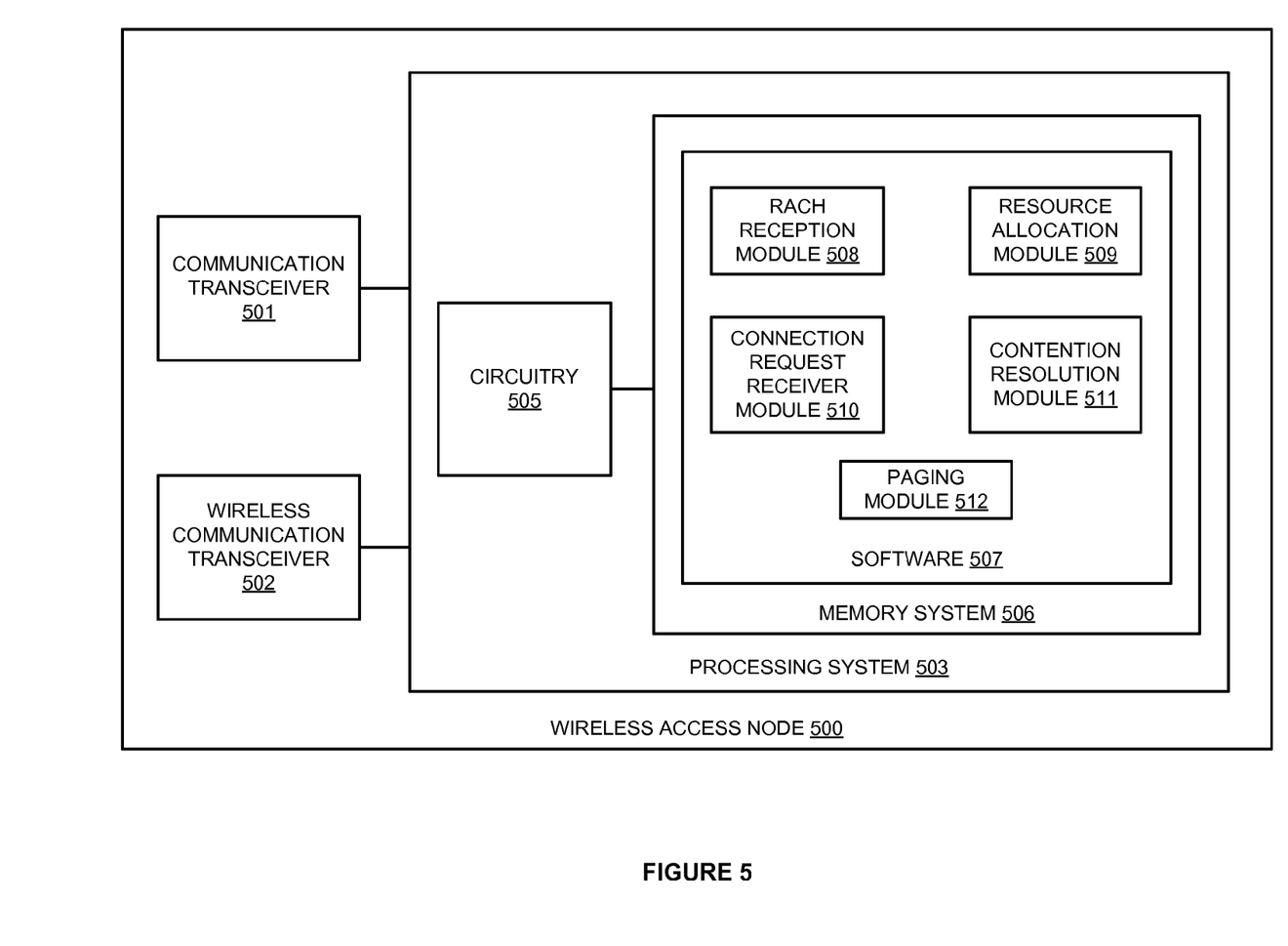
FIG. 5 is a block diagram that illustrates a wireless access node.

FIG. 5 is a block diagram that illustrates wireless access node 500. Wireless access node 500 provides an example of OFDM wireless access node 110, although node 110 may have alternative configurations. Wireless access node 500 comprises communication transceiver 501, wireless communication transceiver 502, and processing system 503. Processing system 503 is linked to communication transceiver 501 and wireless communication transceiver 502. Processing system 503 includes processing circuitry 505 and memory system 506 that stores operating software 507. Operating software 507 comprises software modules 508-512.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format—including combinations thereof.

Wireless communication transceiver 502 comprises RF communication circuitry and an antenna. The RF communication circuitry typically includes an amplifier, filter, RF modulator, and signal processing circuitry. Wireless communication transceiver 502 may also include a memory system, software, processing circuitry, or some other communication device. Wireless communication transceiver 502 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other wireless communication format. Wireless communication transceiver 502 may be configured to receive connection requests on a random access channel transmitted from a first wireless communication device and a second wireless communication device, transmit a resource allocation message comprising a same resource block to both the first wireless communication device and the second wireless communication device, and receive competing connection request messages transmitted from the first wireless communication device and the second wireless communication device on the same resource block. Wireless communication transceiver 502 may be further configured to transfer a contention resolution message for delivery to the first wireless communication device and the second wireless communication device, and to page the second wireless communication device with a contention-free preamble.

Processing circuitry 505 comprises microprocessor and other circuitry that retrieves and executes operating software 507 from memory system 506. Processing circuitry 505 may comprise a single device or could be distributed across multiple devices—including devices in different geographic areas. Processing circuitry 505 may be embedded in various types of equipment. Memory system 506 comprises a non-transitory computer readable storage medium, such as a disk drive, flash drive, data storage circuitry, or some other hardware memory apparatus. Memory system 506 may comprise a single device or could be distributed across multiple devices—including devices in different geographic areas. Memory system 506 may be embedded in various types of equipment. In some examples, a computer apparatus could comprise memory system 506 and operating software 507. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-512, although software 507 could have alternative configurations in other examples.

When executed by circuitry 505, operating software 507 directs processing system 503 to operate as described herein for wireless access node 110. In particular, operating software 507 may direct processing system 503 to direct wireless communication transceiver 502 to receive connection requests on a random access channel transmitted from a first wireless communication device and a second wireless communication device and transmit a resource allocation message comprising a same resource block to both the first wireless communication device and the second wireless communication device. Operating software 507 further directs processing system 503 to direct wireless communication transceiver 502 to receive competing connection request messages transmitted from the first wireless communication device and the second wireless communication device on the same resource block. Operating software 507 directs processing system 503 to generate a contention resolution message comprising a contention resolution identifier associated with the first wireless communication device. Operating software 507 further directs processing system 503 to direct wireless communication transceiver 502 to transfer the contention resolution message for delivery to the first wireless communication device and the second wireless communication device, wherein the first wireless communication device is configured to determine that the contention resolution identifier received in the contention resolution message is associated with the first wireless communication device and to responsively decode connection setup information. Finally, operating software 507 directs processing system 503 to direct wireless communication transceiver 502 to page the second wireless communication device with a contention-free preamble, wherein the second wireless communication device is configured to monitor a channel for the contention-free preamble and utilize the contention-free preamble to request a connection.

In this example, operating software 507 comprises a RACH reception software module 508 that receives connection requests on a random access channel transmitted from a first wireless communication device and a second wireless communication device. Operating software 507 also comprises a resource allocation software module 509 that transmits a resource allocation message comprising a same resource block to both the first wireless communication device and the second wireless communication device. Operating software 507 further comprises a connection request receiver software module 510 that receives competing connection request messages transmitted from the first wireless communication device and the second wireless communication device on the same resource block. Operating software 507 comprises a contention resolution software module 511 that generates a contention resolution message comprising a contention resolution identifier associated with the first wireless communication device, and transfers the contention resolution message for delivery to the first wireless communication device and the second wireless communication device, wherein the first wireless communication device is configured to determine that the contention resolution identifier received in the contention resolution message is associated with the first wireless communication device and to responsively decode connection setup information. Finally, Operating software 507 also comprises a paging software module 512 that pages the second wireless communication device with a contention-free preamble, wherein the second wireless communication device is configured to monitor a channel for the contention-free preamble and utilize the contention-free preamble to request a connection.

Figure 6:
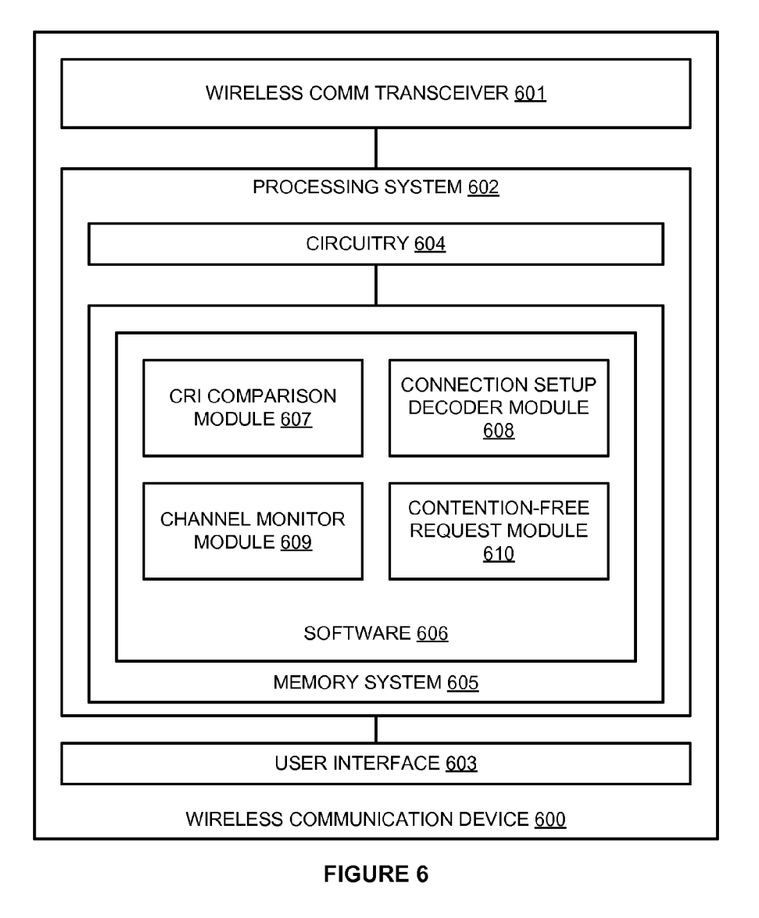
FIG. 6 is a block diagram that illustrates a wireless communication device.

FIG. 6 is a block diagram that illustrates wireless communication device 600. Wireless communication device 600 provides an example of wireless communication devices 101 and 102, although devices 101 and 102 could use alternative configurations. Wireless communication device 600 comprises wireless communication transceiver 601, processing system 602, and user interface 603. Processing system 602 is linked to wireless communication transceiver 601 and user interface 603. Processing system 602 includes processing circuitry 604 and memory system 605 that stores operating software 606. Operating software 606 comprises software modules 607-610. Wireless communication device 600 may include other well-known components such as a battery and enclosure that are not shown for clarity. Wireless communication device 600 may comprise a telephone, computer, e-book, mobile Internet appliance, media player, game console, wireless network interface card, or some other wireless communication apparatus—including combinations thereof.

Wireless communication transceiver 601 comprises RF communication circuitry and an antenna. The RF communication circuitry typically includes an amplifier, filter, RF modulator, and signal processing circuitry. Wireless communication transceiver 601 may also include a memory system, software, processing circuitry, or some other communication device. Wireless communication transceiver 601 may use various protocols, such as CDMA, GSM, UMTS, HSPA, EV-DO, EV-DO rev. A, 3GPP LTE, LTE Advanced, WiMAX, Wi-Fi, Bluetooth, Internet, telephony, or some other wireless communication format. Wireless communication transceiver 601 may be configured to transmit connection requests on a random access channel, and receive a resource allocation message comprising a same resource block as received by another wireless communication device. Wireless communication transceiver 601 may be further configured to receive a contention resolution message. Wireless communication transceiver 601 may also be configured to monitor a channel for a contention-free preamble and utilize the contention-free preamble to request a connection.

User interface 603 comprises components that interact with a user to receive user inputs and to present media and/or information. User interface 603 may include a speaker, microphone, buttons, lights, display screen, touchscreen, touch pad, scroll wheel, communication port, or some other user input/output apparatus—including combinations thereof. User interface 603 may be omitted in some examples.

Processing circuitry 604 comprises microprocessor and other circuitry that retrieves and executes operating software 606 from memory system 605. Processing circuitry 604 may comprise a single device or could be distributed across multiple devices—including devices in different geographic areas. Processing circuitry 604 may be embedded in various types of equipment. Processing circuitry 604 is typically mounted on a circuit board that may also hold memory system 605 and portions of wireless communication transceiver 601 and user interface 603. Memory system 605 comprises a non-transitory computer readable storage medium, such as a disk drive, flash drive, data storage circuitry, or some other hardware memory apparatus. Memory system 605 may comprise a single device or could be distributed across multiple devices—including devices in different geographic areas. Memory system 605 may be embedded in various types of equipment. In some examples, a computer apparatus could comprise memory system 605 and operating software 606. Operating software 606 comprises computer programs, firmware, or some other form of machine-readable processing instructions. Operating software 606 may include an operating system, utilities, drivers, network interfaces, applications, or some other type of software. In this example, operating software 606 comprises software modules 607-610, although software 606 could have alternative configurations in other examples.

When executed by processing circuitry 604, operating software 606 directs processing system 602 to operate wireless communication device 600 as described herein for wireless communication devices 101 and 102. In particular, operating software 606 may direct processing system 602 to direct wireless communication transceiver 601 to transmit connection requests on a random access channel and receive a resource allocation message comprising a same resource block as received by another wireless communication device in contention for the resource allocation. Operating software 606 may further direct processing system 602 to direct wireless communication transceiver 601 to transmit a connection request message on the same resource block and receive a contention resolution message comprising a contention resolution identifier associated with a first wireless communication device. Operating software 606 may direct processing system 602 to determine that the contention resolution identifier received in the contention resolution message is associated with the first wireless communication device and to responsively decode connection setup information. Operating software 606 may further direct processing system 602 to direct wireless communication transceiver 601 to monitor a channel for a contention-free preamble and utilize the contention-free preamble to request a connection.

In this example, operating software 606 comprises a CRI comparison software module 607 that compares a contention resolution identifier received in a contention resolution message to a contention resolution identifier included in a connection request message by wireless communication device 600 to determine whether or not the contention resolution identifier received in the contention resolution message is associated with wireless communication device 600. Operating software 606 further comprises a connection setup decoder software module 608 that, when the CRI comparison software module 607 determines that the contention resolution identifier received in the contention resolution message is associated with wireless communication device 600, responsively decodes connection setup information. Operating software 606 also comprises a channel monitor software module 609 that monitors a channel for the contention-free preamble when the CRI comparison software module 607 determines that the contention resolution identifier received in the contention resolution message is not associated with wireless communication device 600. Finally, operating software 606 comprises a contention-free request software module 610 that utilizes the contention-free preamble to request a connection.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating an orthogonal frequency-division multiplexing (OFDM) wireless access node to facilitate contention resolution between wireless communication devices, the method comprising:
    receiving connection requests on a random access channel transmitted from a first wireless communication device and a second wireless communication device;
    transmitting a resource allocation message comprising a same resource block to both the first wireless communication device and the second wireless communication device;

receiving competing connection request messages transmitted from the first wireless communication device and the second wireless communication device on the same resource block and selecting the first wireless communication device for connection setup; and responsive to selecting the first wireless communication device for connection setup, generating a contention resolution message comprising a contention resolution identifier associated with the first wireless communication device, transferring the contention resolution message for delivery to the first wireless communication device and the second wireless communication device, and paging the second wireless communication device with a contention-free preamble, wherein the first wireless communication device is configured to determine that the contention resolution identifier received in the contention resolution message is associated with the first wireless communication device and to responsively decode connection setup information, and wherein the second wireless communication device is configured to monitor a channel for the contention-free preamble and utilize the contention-free preamble to request a connection.

2. The method of claim 1 wherein receiving the connection requests on the random access channel transmitted from the first wireless communication device and the second wireless communication device comprises receiving the connection requests on the random access channel with a same preamble sequence and having a same random access radio network temporary identifier.

3. The method of claim 1 wherein the competing connection request messages comprise a first connection request message comprising a first contention resolution identifier associated with the first wireless communication device and second connection request message comprising a second contention resolution identifier associated with the second wireless communication device.

4. The method of claim 3 wherein the first wireless communication device configured to determine that the contention resolution identifier received in the contention resolution message is associated with the first wireless communication device comprises the first wireless communication device configured to determine that the contention resolution identifier received in the contention resolution message matches the first contention resolution identifier associated with the first wireless communication device.

5. The method of claim 3 wherein the second wireless communication device is configured to determine that the contention resolution identifier received in the contention resolution message does not match the second contention resolution identifier associated with the second wireless communication device.

6. The method of claim 5 wherein the second wireless communication device configured to monitor the channel for the contention-free preamble comprises the second wireless communication device configured to monitor the channel for the contention-free preamble responsive to determining that the contention resolution identifier received in the contention resolution message does not match the second contention resolution identifier associated with the second wireless communication device.

7. The method of claim 1 wherein the second wireless communication device configured to monitor the channel for the contention-free preamble comprises the second wireless communication device configured to monitor a physical downlink control channel for the contention-free preamble.

8. An orthogonal frequency-division multiplexing (OFDM) wireless access node to facilitate contention resolution between wireless communication devices, the OFDM wireless access node comprising:

a wireless communication transceiver configured to receive connection requests on a random access channel transmitted from a first wireless communication device and a second wireless communication device, transmit a resource allocation message comprising a same resource block to both the first wireless communication device and the second wireless communication device, and receive competing connection request messages transmitted from the first wireless communication device and the second wireless communication device on the same resource block; and a processing system configured to select the first wireless communication device for connection setup and responsively generate a contention resolution message comprising a contention resolution identifier associated with the first wireless communication device and direct the wireless communication transceiver to transfer the contention resolution message for delivery to the first wireless communication device and the second wireless communication device and page the second wireless communication device with a contention-free preamble, wherein the first wireless communication device is configured to determine that the contention resolution identifier received in the contention resolution message is associated with the first wireless communication device and to responsively decode connection setup information, and wherein the second wireless communication device is configured to monitor a channel for the contention-free preamble and utilize the contention-free preamble to request a connection.

9. The OFDM wireless access node of claim 8 wherein the wireless communication transceiver configured to receive the connection requests on the random access channel transmitted from the first wireless communication device and the second wireless communication device comprises the wireless communication transceiver configured to receive the connection requests on the random access channel with a same preamble sequence and having a same random access radio network temporary identifier.

10. The OFDM wireless access node of claim 8 wherein the competing connection request messages comprise a first connection request message comprising a first contention resolution identifier associated with the first wireless communication device and second connection request message comprising a second contention resolution identifier associated with the second wireless communication device.

11. The OFDM wireless access node of claim 10 wherein the first wireless communication device configured to determine that the contention resolution identifier received in the contention resolution message is associated with the first wireless communication device comprises the first wireless communication device configured to determine that the contention resolution identifier received in the contention resolution message matches the first contention resolution identifier associated with the first wireless communication device.

12. The OFDM wireless access node of claim 10 wherein the second wireless communication device is configured to determine that the contention resolution identifier received in the contention resolution message does not match the second contention resolution identifier associated with the second wireless communication device.

13. The OFDM wireless access node of claim 12 wherein the second wireless communication device configured to monitor the channel for the contention-free preamble comprises the second wireless communication device configured to monitor the channel for the contention-free preamble responsive to determining that the contention resolution identifier received in the contention resolution message does not match the second contention resolution identifier associated with the second wireless communication device.

14. The OFDM wireless access node of claim 8 wherein the second wireless communication device configured to monitor the channel for the contention-free preamble comprises the second wireless communication device configured to monitor a physical downlink control channel for the contention-free preamble.

15. A computer apparatus to operate an orthogonal frequency-division multiplexing (OFDM) wireless access node to facilitate contention resolution between wireless communication devices, the computer apparatus comprising:
   software instructions configured, when executed by the OFDM wireless access node, to direct the OFDM wireless access node to receive connection requests on a random access channel transmitted from a first wireless communication device and a second wireless communication device, transmit a resource allocation message comprising a same resource block to both the first wireless communication device and the second wireless communication device, receive competing connection request messages transmitted from the first wireless communication device and the second wireless communication device on the same resource block, select the first wireless communication device for connection setup and responsively generate a contention resolution message comprising a contention resolution identifier associated with the first wireless communication device, transfer the contention resolution message for delivery to the first wireless communication device and the second wireless communication device, and page the second wireless communication device with a contention-free preamble, wherein the first wireless communication device is configured to determine that the contention resolution identifier received in the contention resolution message is associated with the first wireless communication device and to responsively decode connection setup information,
   and wherein the second wireless communication device is configured to monitor a channel for the contention-free preamble and utilize the contention-free preamble to request a connection; and
   at least one non-transitory computer-readable storage medium storing the software instructions.

16. The computer apparatus of claim 15 wherein receiving the connection requests on the random access channel transmitted from the first wireless communication device and the second wireless communication device comprises receiving the connection requests on the random access channel with a same preamble sequence and having a same random access radio network temporary identifier.

17. The computer apparatus of claim 15 wherein the competing connection request messages comprise a first connection request message comprising a first contention resolution identifier associated with the first wireless communication device and second connection request message comprising a second contention resolution identifier associated with the second wireless communication device.

18. The computer apparatus of claim 17 wherein the first wireless communication device configured to determine that the contention resolution identifier received in the contention resolution message is associated with the first wireless communication device comprises the first wireless communication device configured to determine that the contention resolution identifier received in the contention resolution message matches the first contention resolution identifier associated with the first wireless communication device.

19. The computer apparatus of claim 17 wherein the second wireless communication device is configured to determine that the contention resolution identifier received in the contention resolution message does not match the second contention resolution identifier associated with the second wireless communication device.

20. The computer apparatus of claim 19 wherein the second wireless communication device configured to monitor the channel for the contention-free preamble comprises the second wireless communication device configured to monitor the channel for the contention-free preamble responsive to determining that the contention resolution identifier received in the contention resolution message does not match the second contention resolution identifier associated with the second wireless communication device.

* * * * *